United States Patent [19]

Umemoto et al.

[11] Patent Number: 4,478,447

[45] Date of Patent: Oct. 23, 1984

[54] TEXTURED SURFACE PATTERN FOR AN AUTOMOBILE BUMPER

[75] Inventors: Yoshiro Umemoto, Nagoya; Tsugumi Sanmiya, Toyota, both of Japan

[73] Assignee: Toyota Jidosha Kabushiki Kaisha, Toyota, Japan

[21] Appl. No.: 454,011

[22] Filed: Dec. 28, 1982

[30] Foreign Application Priority Data

Dec. 28, 1981 [JP] Japan .............................. 56-197900[U]

[51] Int. Cl.³ .............................................. B60R 19/10
[52] U.S. Cl. ..................................... 293/102; 213/220; 293/1; 293/120; 293/136
[58] Field of Search .................... 293/102, 136, 1, 120; 213/220

[56] References Cited

U.S. PATENT DOCUMENTS 1,026,063  5/1912  Watkins .............................. 213/220
3,850,474 11/1974  Welch ................................. 293/102
4,106,804  8/1978  Scrivo ................................ 293/136

Primary Examiner—Richard A. Bertsch
Attorney, Agent, or Firm—Kenyon & Kenyon

[57] ABSTRACT

A textured surface pattern of projections and recesses provides a good appearance and low susceptibility to damage and clogging by dirt and wax for an automobile bumper made of synthetic resin. The depth of the pattern is in the range from 20 to 70μ, the curvature of the tops of the projections is in the range from 3 to 30μ, the curvature of the bottoms of the recesses is in the range from 2 to 30μ, the depth as measured from the level where each recess has a width of 200μ to the bottom of the recess is less than 20μ, and the distance from one top to any adjacent top is less than 2500μ.

7 Claims, 5 Drawing Figures

TEXTURED SURFACE PATTERN FOR AN AUTOMOBILE BUMPER

BACKGROUND OF THE INVENTION

The present invention relates to automobile bumpers, particularly to plastic bumpers having a textured surface.

Almost all conventional bumpers made of polypropylene have roughened or textured surfaces to reduce the susceptibility to scratching. The textured surface pattern tends to retain mud or body wax, however, resulting in unsightly appearance of the bumper. Therefore, there has been a need for improving such bumpers.

SUMMARY OF THE INVENTION

Thus, an object of the present invention is to provide an automobile bumper free from the drawbacks encountered by the conventional automobile bumper with a textured surface.

More specifically, the object of the present invention is to provide an automobile bumper surface that is resistant to marring by scratches or dents and reduces the visibility of damage that does occur.

Another object of the invention is to provide an automobile bumper surface having little tendency to clog with mud or wax.

A further object of the present invention is to provide an automobile bumper surface which is easy to coat with paint.

A still further object of the present invention is to provide an automobile bumper surface having a pleasing appearance.

According to the present invention, a textured pattern of projections and recesses is provided on the surface of the automobile bumper such that the depth of the recesses is in the range from 20 to 70$\mu$ (i.e., microns), the curvature (i.e., radius of curvature) of the tops of the projections is in the range from 3 to 30$\mu$, the curvature of the bottoms of the recesses is in the range from 2 to 30$\mu$, the depth as measured from the level where each recess has a width of 200$\mu$ to the bottom of the recess is less than 20$\mu$, and the distance from one top to any adjacent top is less than 2500$\mu$.

Other objects and features of the present invention will be apparent upon reading of the following description of the invention in conjunction with the attached drawings, with the understanding that such deviations and modifications of the invention can be made within the scope of the appended claims without departing from the spirit of the invention.

DETAILED DESCRIPTION OF THE PREFERRED EMBODIMENT

Figure 1:
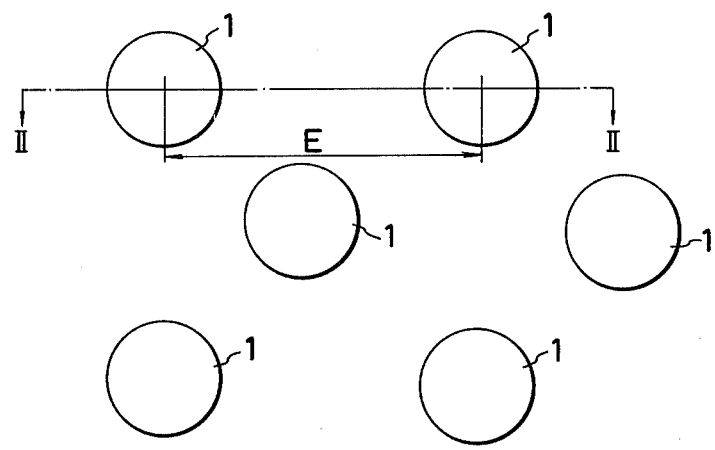
FIG. 1 shows schematically the positional relation between projections formed on an automobile bumper surface embodying the present invention.

In FIG. 1, typical relative positions of projections of a textured surface according to the invention are indicated schematically by circles 1. The pattern consists of projections and recesses alternatively and smoothly formed on the surface of an automobile bumper. The projections and recesses are uniformly distributed over the entire surface of the bumper.

Figure 2:
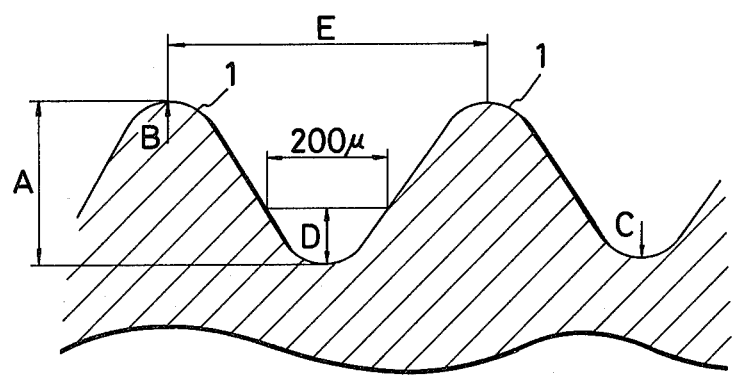
FIG. 2 is a cross-sectional view of the automobile bumper surface, taken along line II—II of FIG. 1.

Symbols in FIG. 2 are defined as follows: the depth of the textured pattern is A, the curvature of the tops of the projections is B, the curvature of the bottoms of the recesses is C, the depth of each recess as measured from a level where the recess has a width of 200$\mu$ is D, and the distance from one top to an adjacent top is E.

Optimum values of these dimensions are as follows:

The depth A of the recesses is in the range from 20 to 70$\mu$.

The curvature B of the tops is in the range from 3 to 30$\mu$.

The curvature C of the bottoms of the recesses is in the range from 2 to 30$\mu$.

The depth D of each recess, as measured from the level where the recess has a width of 200$\mu$, is less than 20$\mu$.

The distance E from one top to any adjacent top is less than 2500$\mu$.

The projections and recesses may be arranged in an arbitrary pattern so long as the distance from one top to any adjacent top is less than 2500$\mu$.

To obtain the best pattern on the bumper surface, the foregoing dimensions were determined taking into account the following four factors which are indicative of pattern characteristics:

(1) esthetic appearance, (2) damage resistance or inconspicuousness of damage, (3) tendency to retain mud, body wax, or other foreign matter, and (4) ease of painting.

The above four points were evaluated as follows:

The appearance was rated subjectively, whether a textured pattern gave an ordinary person an unnatural feeling from the standpoint of appearance. The inconspicuousness of damage was graded in five levels after the bumper had been subjected to various damage tests, such as automatic car washing (10 times), a shot peening test (200 g, 0.5 Kg/cm$^2$), a ball drop test (500 g, 80 cm), a scratch test, or the like. As for tendency to retain mud, body, wax, or other foreign matter, the appearance was graded in five levels after the bumper was clogged with mud and then washed by water, and after the surface was coated with body wax and then wiped off with a rag. The ease of painting was evaluated by painting the bumper with a white top coating having a thickness of 30$\mu$, and then determining whether or not there were skips (uncoated areas).

Table 1 shows results of the above tests conducted on surfaces having the indicated characteristic dimensions. According to the test results, the depth A of the pattern is better in the range from 20 to 60$\mu$, and preferably should be limited to the range of from 30 to 45$\mu$. If the pattern depth A is less than 20$\mu$, then any damage will become visible, and if the depth A is greater than 60$\mu$, then the pattern will be more clogged up with mud, wax and the like, resulting in an unsightly appearance, and there will be more skips of coat on the bumper.

TABLE 1

Test Results

| Test No. | Aμ (Depth) | Bμ (Top curvature) | Cμ (Bottom curvature) | Dμ | Eμ | Appearance | Easy to be damaged Bad Good 1-5 | Tendency to get clogged Bad Good 1-5 | Facility to coat | Overall rating |
|---|---|---|---|---|---|---|---|---|---|---|
| 1  | 50  | 2  | 1  | 18 | 800  | o | 5 | 4 | x | x |
| 2  | 95  | 2  | 1  | 26 | 800  | o | 5 | 1 | x | x |
| 3  | 30  | 8  | 4  | 16 | 1100 | o | 5 | 4 | Δ | Δ |
| 4  | 70  | 2  | 1  | 28 | 500  | o | 5 | 3 | x | x |
| 5  | 65  | 2  | 1  | 15 | 800  | o | 5 | 5 | x | x |
| 6  | 110 | 2  | 1  | 28 | 1200 | o | 5 | 2 | x | x |
| 7  | 40  | 3  | 2  | 17 | 550  | o | 3 | 4 | Δ | Δ |
| 8  | 55  | 2  | 1  | 22 | 750  | o | 5 | 3 | x | x |
| 9  | 35  | 5  | 3  | 14 | 750  | o | 5 | 4 | Δ | Δ |
| 10 | 75  | 2  | 1  | 22 | 950  | o | 5 | 3 | x | x |
| 11 | 35  | 11 | 13 | 7  | 800  | o | 5 | 5 | o | o |
| 12 | 50  | 8  | 7  | 10 | 700  | o | 5 | 4 | o | Δ |
| 13 | 35  | 3  | 3  | 13 | 850  | o | 5 | 4 | o | Δ |
| 14 | 90  | 1  | 1  | 28 | 1100 | o | 5 | 1 | x | x |
| 15 | 75  | 2  | 2  | 28 | 800  | o | 5 | 2 | x | x |
| 16 | 100 | 1  | 1  | 30 | 900  | o | 5 | 1 | x | x |
| 17 | 15  | 13 | 12 | 5  | 2000 | x | 3 | 5 | o | x |
| 18 | 20  | 20 | 22 | 3  | 2500 | x | 1 | 5 | o | x |
| 19 | 45  | 8  | 2  | 22 | 1000 | o | 5 | 3 | Δ | x |

The curvature B of the tops of the projections is better in the range from 3 to 30μ, and preferably should be in the range from 10 to 20μ. If the curvature B is smaller than 3μ, then paint skips will result, and if the curvature B is larger than 30μ, then the appearance becomes undesirable. The curvature C of the bottoms of the recesses is better in the range from 3 to 30μ, and preferably should be in the range from 10 to 20μ. If the curvature C is less than 3μ, then the patterns will be much more clogged with mud and wax, and if the curvature E exceeds 30μ, then the appearance of the textured pattern becomes poor. The depth D of each recess as measured from the level where the recess had a width of 200μ should be less than 20μ, and preferably should be in the range from 2 to 15μ. If the depth D is greater than 20μ, the surface will be more susceptible to clogging with mud and wax, resulting in a poor appearance. The distance E between adjacent tops of projections should be 2500μ or less. If the distance E is more than 2500μ, then the patterns will lose its intended functions; the appearance will be poor and the surface will be easily damaged. Most preferably, the distances between adjacent tops of projections in the pattern should be the same.

Figure 3:
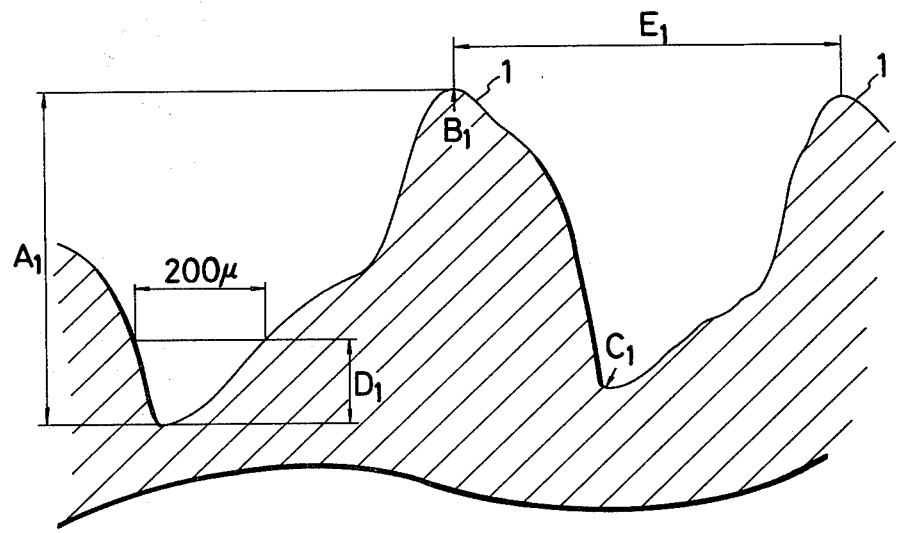
FIG. 3 is a cross-sectional view of a roughened surface formed on a conventional automobile bumper.

FIG. 3 illustrates one example of an undesirable texture pattern, which was constructed for test No. 15, in which $A_1 = 75\mu$, $B_1 = 2\mu$, $C = 2\mu$, $D_1 = 28\mu$, and $E = 800\mu$. The pattern shown in FIG. 3 suffered from wax clogging and skips of coat, and was evaluated generally poor.

Figure 4:
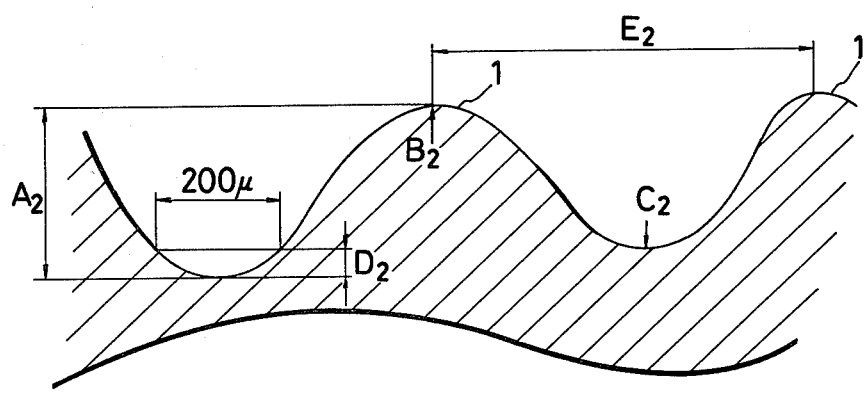
FIG. 4 is a cross-sectional view of the optimum texture pattern according to the present invention.

FIG. 4 shows an acceptable example, used in test No. 11, in which $A_2 = 35\mu$, $B_2 = 11\mu$, $C_2 = 13\mu$, $D_2 = 7\mu$, and $E_2 = 800\mu$. The texture pattern of FIG. 4 was not clogged with mud and wax, was painted well, had a good appearance, and hence was almost completely optimum.

Figure 5:
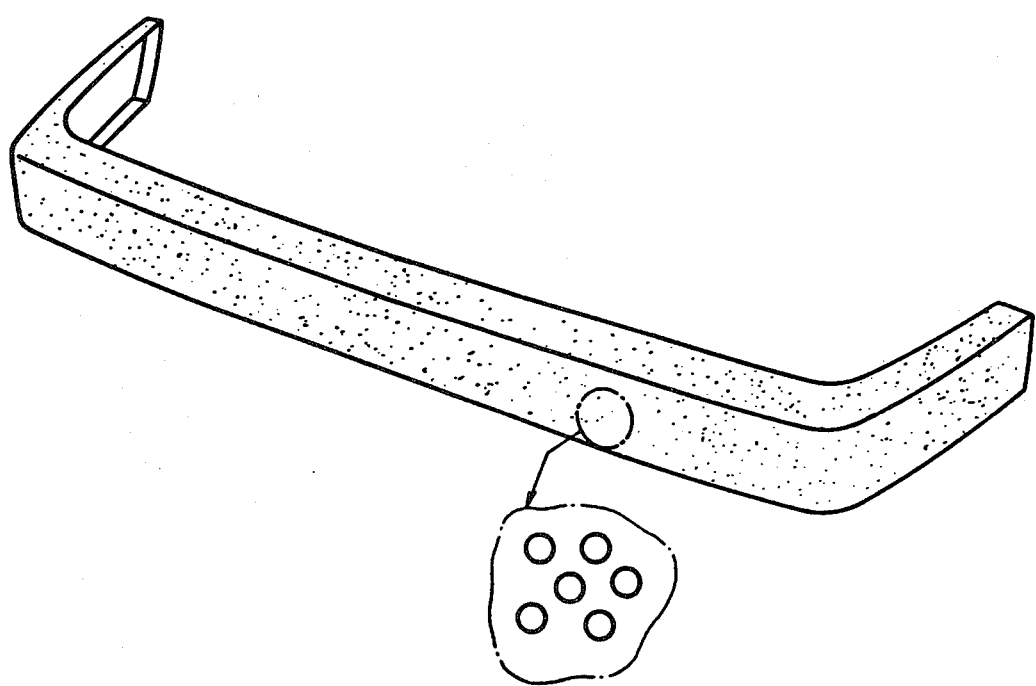
FIG. 5 is a perspective view of an automobile bumper of conventional design having a surface texture according to FIG. 1.

The automobile bumper surface according to the present invention may be prepared by the conventional process, for instance, injection-molding. FIG. 5, for example, shows such an injection-molded bumper of conventional form, but having a surface texture corresponding to that shown in enlarged detail in FIGS. 1 and 2.

By use of this invention the surface of an automobile bumper will resist damage, will reduce the visibility of damage, will be hard to clog with mud, wax and other foreign materials, and will provide a good appearance.

What we claim is:

1. An automobile bumper made of synthetic resin comprising an exposed surface provided with a pattern of projections and recesses for reducing adherence of mud and visibility of scratches and minor dents, wherein the pattern of projections and depressions is continuous over the entire exposed surface of the bumper, the depth of the pattern is in the range from 20 to 70μ, the radius of curvature of the tops of the projections is in the range from 3 to 30μ, and the radius of curvature of the bottoms of the recesses is in the range from 2 to 30μ, the depth of each recess as measured from a level where said recess has a width of 200μ is less than 20μ, and the distance from one top of any adjacent top is less than 2500μ.

2. An automobile bumper according to claim 1, wherein said depth of the pattern is in the range from 30 to 45μ.

3. An automobile bumper according to claim 1, wherein said radius of curvature of the tops of the projections is in the range from 10 to 20μ.

4. An automobile bumper according to claim 1, wherein said radius of curvature of the bottom of the recesses is in the range from 10 to 20μ.

5. An automobile bumper according to claim 1, wherein said depth of each recess measured from a level where the recess has a width of 200μ is in the range from 2 to 15μ.

6. An automobile bumper according to claim 1, wherein the distance from one top to any adjacent top is the same.

7. An automobile bumper according to claim 1, wherein said bumper is made from polypropylene.

* * * * *